March 4, 1969 L. R. STONE ET AL 3,431,415
NUCLEAR GAGING SYSTEM FOR MOISTURE CONTENT OF IRREGULAR
STREAM OF BULK MATERIAL
Original Filed Jan. 8, 1964

INVENTORS
LEONARD R. STONE
BY THOMAS E. REIM
NICHOLAS G. MUSKOVAC
JAMES E. COOK
ATTORNEY

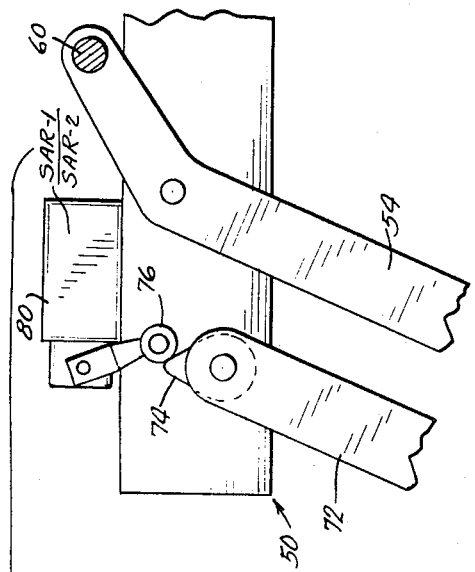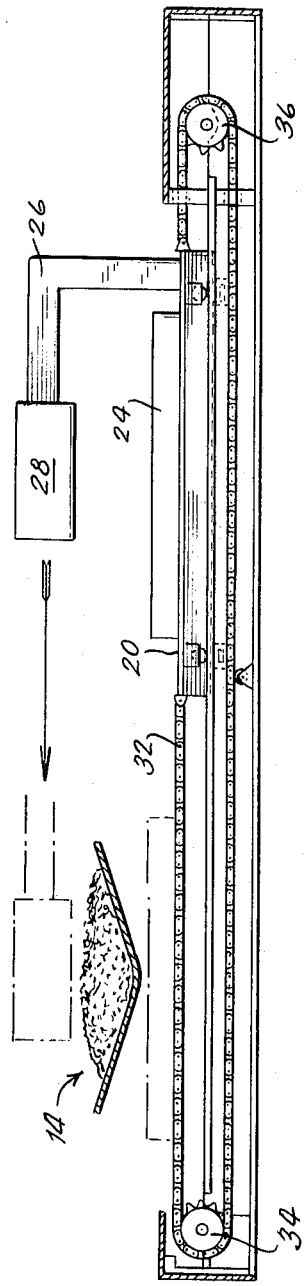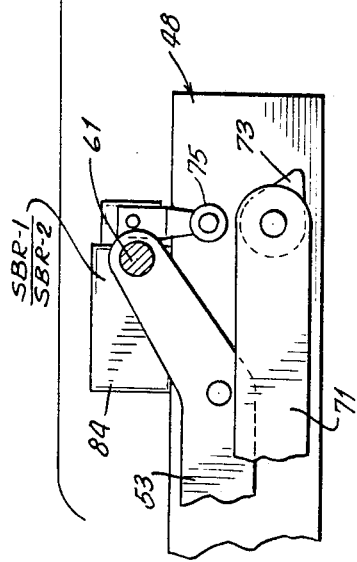

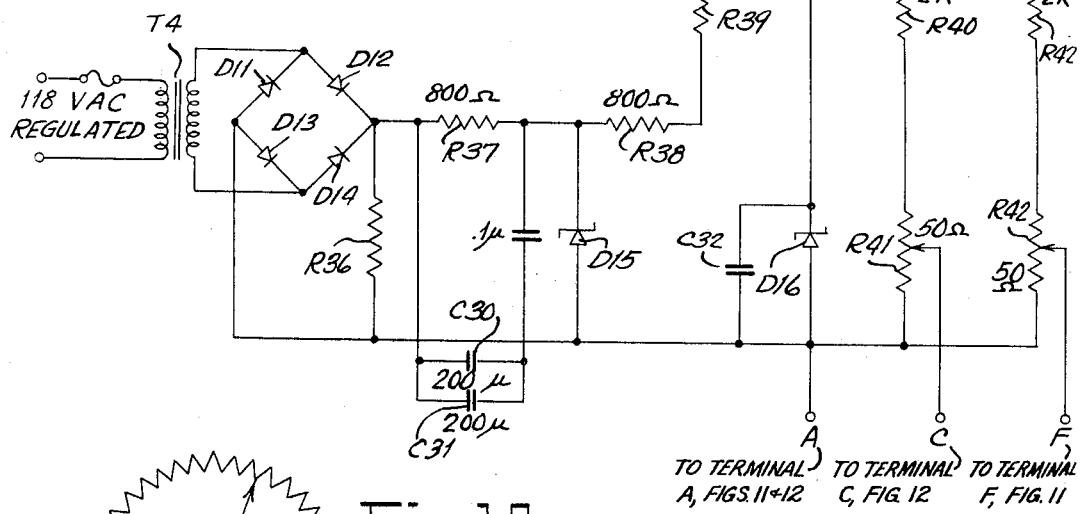
Fig. 17.
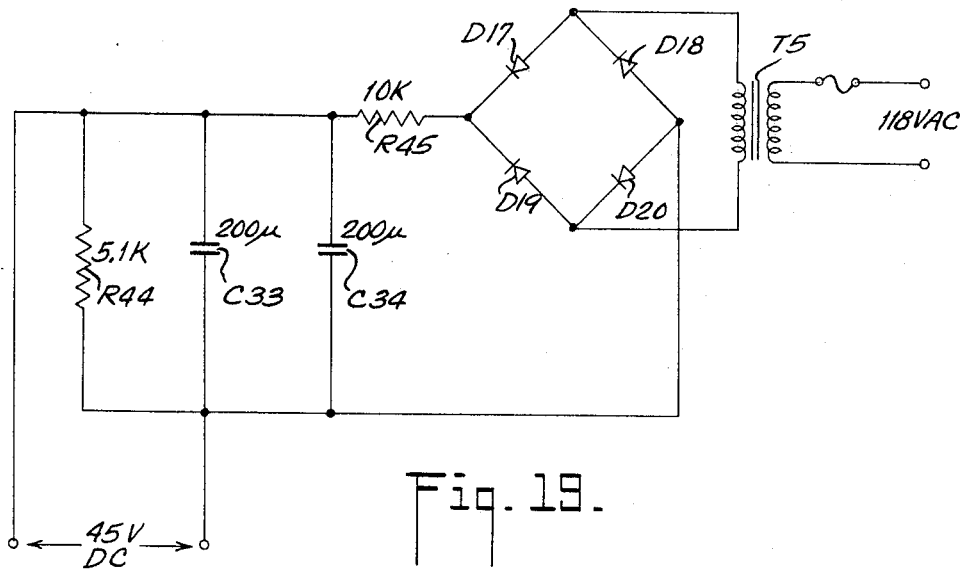
Fig. 18.
RECORDER TRANSMITTING
SLIDE WIRE (R-81)
Fig. 19.

United States Patent Office 3,431,415
Patented Mar. 4, 1969

3,431,415
NUCLEAR GAGING SYSTEM FOR MOISTURE CONTENT OF IRREGULAR STREAM OF BULK MATERIAL
Leonard R. Stone, Cleveland, and Thomas E. Reim, Willowick, Ohio, Nicholas G. Muskovac, North Stamford, Conn., and James E. Cook, Philadelphia, Pa., assignors to Republic Steel Corporation, Cleveland, Ohio, a corporation of New Jersey
Continuation of application Ser. No. 336,474, Jan. 8, 1964. This application Feb. 17, 1967, Ser. No. 616,992
U.S. Cl. 250—83.1     10 Claims
Int. Cl. G01t 3/00

ABSTRACT OF THE DISCLOSURE

There is disclosed a bulk material moisture gaging system having a source of fast neutron and gamma radiation for irradiation of substantially an entire cross-sectional volume of a bulk substance moving in a confined stream of irregular and varying cross section independently of the cross-sectional geometry of the stream. Slow neutron responsive means responsive to slow neutrons from the cross-sectional volume irradiated by neutrons derive a first electrical control energy varying with the moisture content of an irradiation volume of the substance and gamma responsive means responsive to gamma radiation from the cross-sectional volume irradiated by gamma radiation derive a second electrical control energy varying with the mass of said substance in an irradiation volume thereof. Finally, means jointly responsive to the first and second electrical control energies obtain the ratio existing between the first and second control energies and generate an output signal proportional to the weight percentage moisture content of the substance substantially independently of the geometry of the material in the stream of material being gaged. Mechanism is provided for withdrawing the radiant source holder and the detectors from gaging position to an inactive calibrating position for periodically calibrating the system in reference to mobile calibration blocks movable into and out of the gaging zone between source and detector.

This invention, which is a continuation of now abandoned application, Serial No. 336,474, filed January 8, 1964, relates to a nuclear moisture gage. In particular, the invention relates to a nuclear moisture gage for measuring, indicating and controlling the moisture in moisture-containing solids.

The invention was conceived and developed for the measurement and control of moisture in sinter mix materials as they are transported on a conveyor belt. Therefore, the invention will be described in this particular environment, although, manifestly, it is equally applicable to other uses.

It is a purpose of the invention to provide means for the continuous measurement and control of the moisture content of a flowing stream of materials.

A further object of the invention contemplates a moisture measuring system which is substantially independent of the bulk or geometry of the process material.

An additional objective of the invention relates to means for periodically calibrating the gage. In this regard, it is a specific object of the invention to provide a time controlled self-calibrating system which will operate to perform a calibrating sequence on the gage circuits at preselected intervals.

It is a further object of the invention to provide a moisture gage which is physically independent of the material which is being gaged.

These and other objects and advantages are attained by resort to a nuclear moisture gage system which includes as basic components thereof, a source of fast neutrons and a plurality of slow neutron detectors to measure the moisture content of the mixture, in combination with a source of gamma rays and a plurality of gamma ray detectors to measure the amount of material being gaged.

According to the invention, the fast neutrons are slowed down primarily by collisions with hydrogen atoms. The number of slow neutrons produced by these interactions is a measure of the hydrogen present in the mixture. Since almost all of hydrogen atoms in the mixture are in the water, the output of the slow neutron detectors provides a measure of the moisture content of the mixture.

The output of the gamma ray detectors is used to make the gage geometry independent of the bulk of the material by compensating the moisture detector output for varying amounts of material being processed. The gamma rays are attenuated in passing through the material, therefore, the amount of gamma radiation reaching the detectors is a function of the amount of mixture being gaged.

The neutron detector output (total moisture) and the gamma detector output (total material weight) are combined in an electronic ratio circuit to produce a final output which is the measure of the percentage of moisture by weight. This measurement is independent of the amount of material being gaged. Water addition to the mixture is automatically adjusted to maintain the moisture content of the mixture at a preset value.

The gaging assembly which houses the radiation sources and the detector units is mounted for movement into operative relation with a calibration assembly at which either of two calibration blocks may be positioned in the radiation beam for performing a calibration sequence which consists of the sequenced insertion of the calibration blocks into the radiation beam and the automatic adjustment of the gaging system in response to the detector outputs during the calibration sequence. The calibration operations are controlled by a sequence timer which renders the calibrating operation automatic.

The invention is fully expalined in the following specification in reference to the accompanying drawings.

In these drawings:

FIG. 8 is an enlarged fragmentary view on line 8—8 of FIG. 3;

FIG. 9 is a longitudinal view, partly in section and partly in full line, of the gaging and calibrating assembly on a somewhat reduced scale and showing the mechanism in calibrating position as in FIG. 5;

Figure 10:
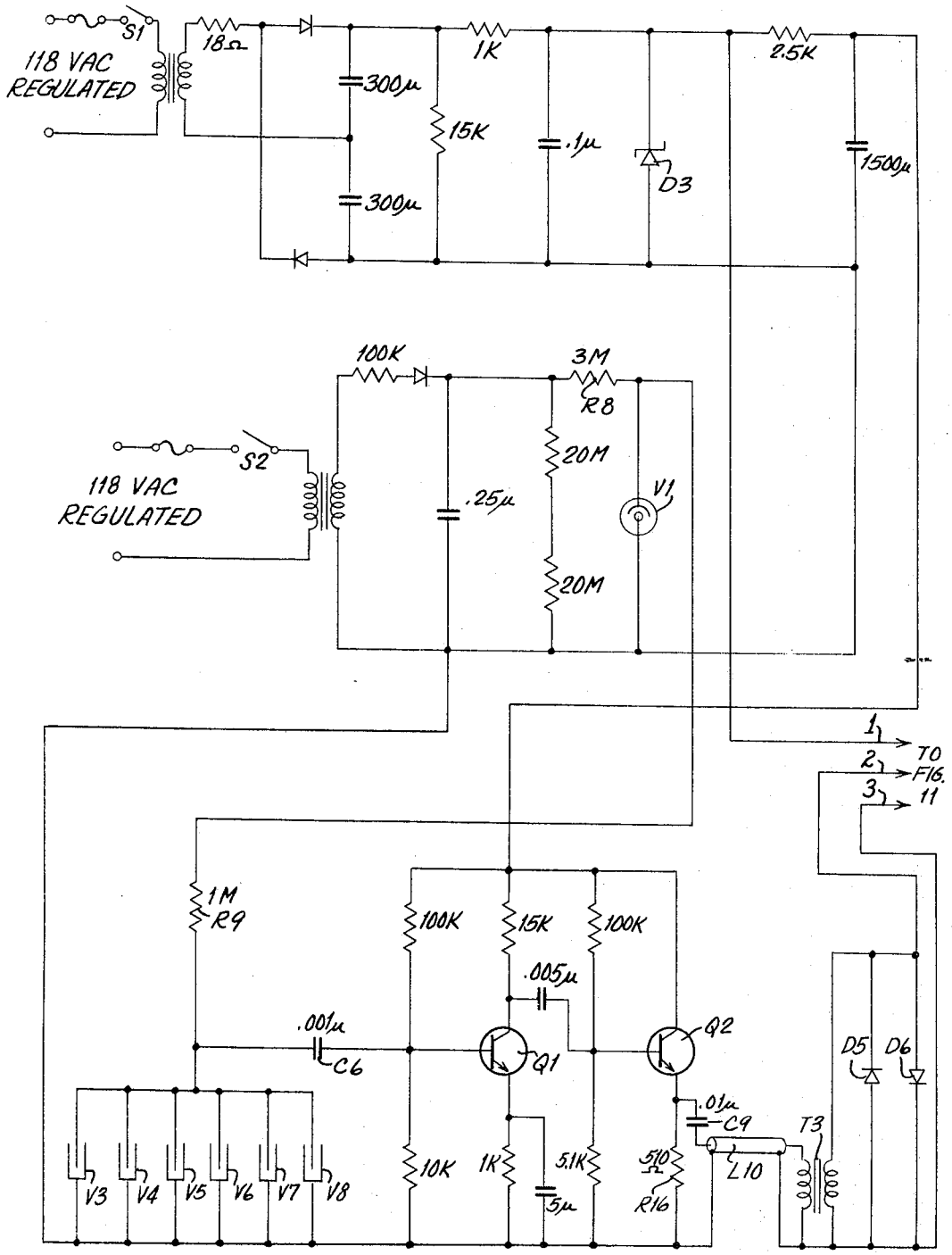
Figure 11:
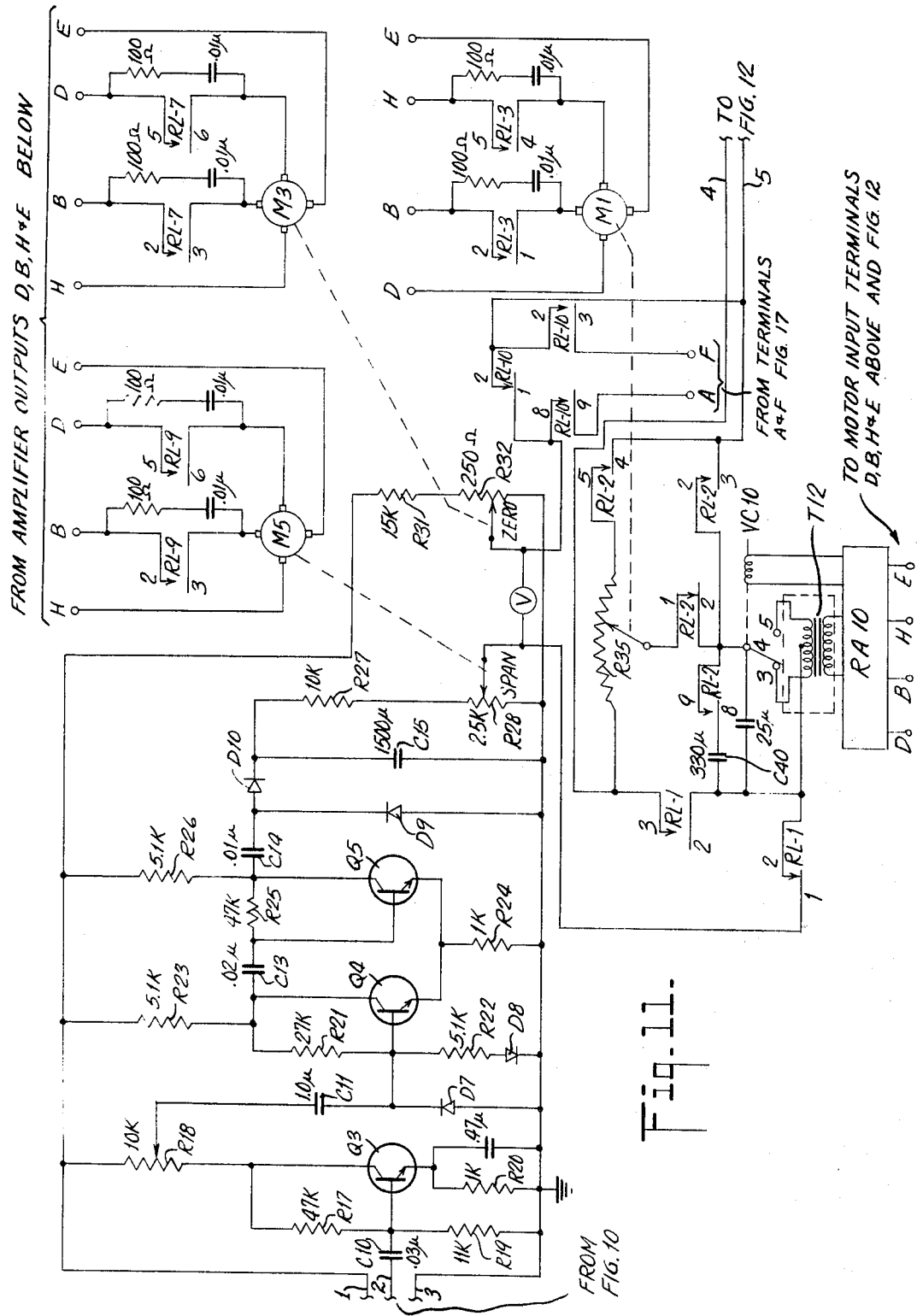
Figure 12:
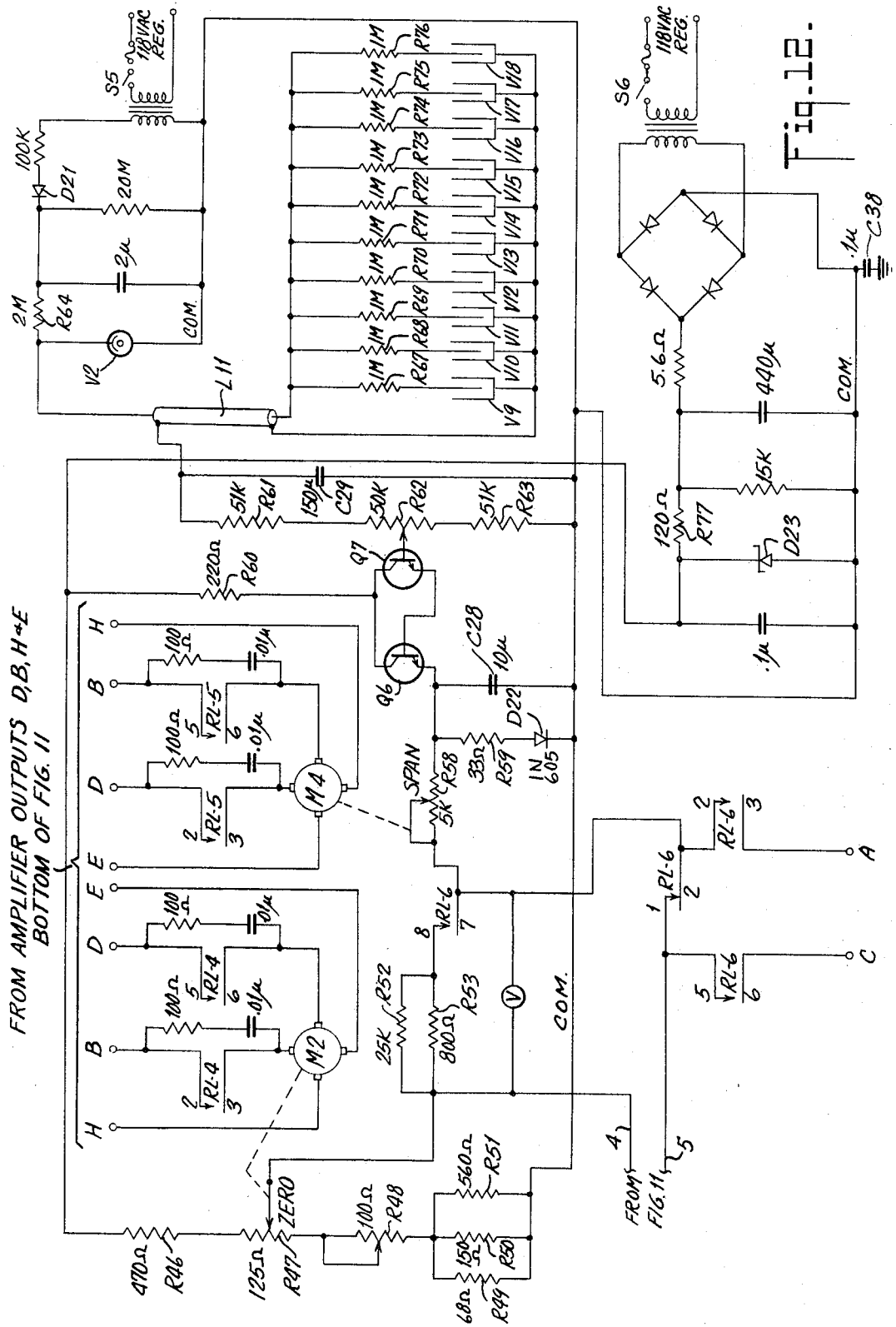
Figure 13:
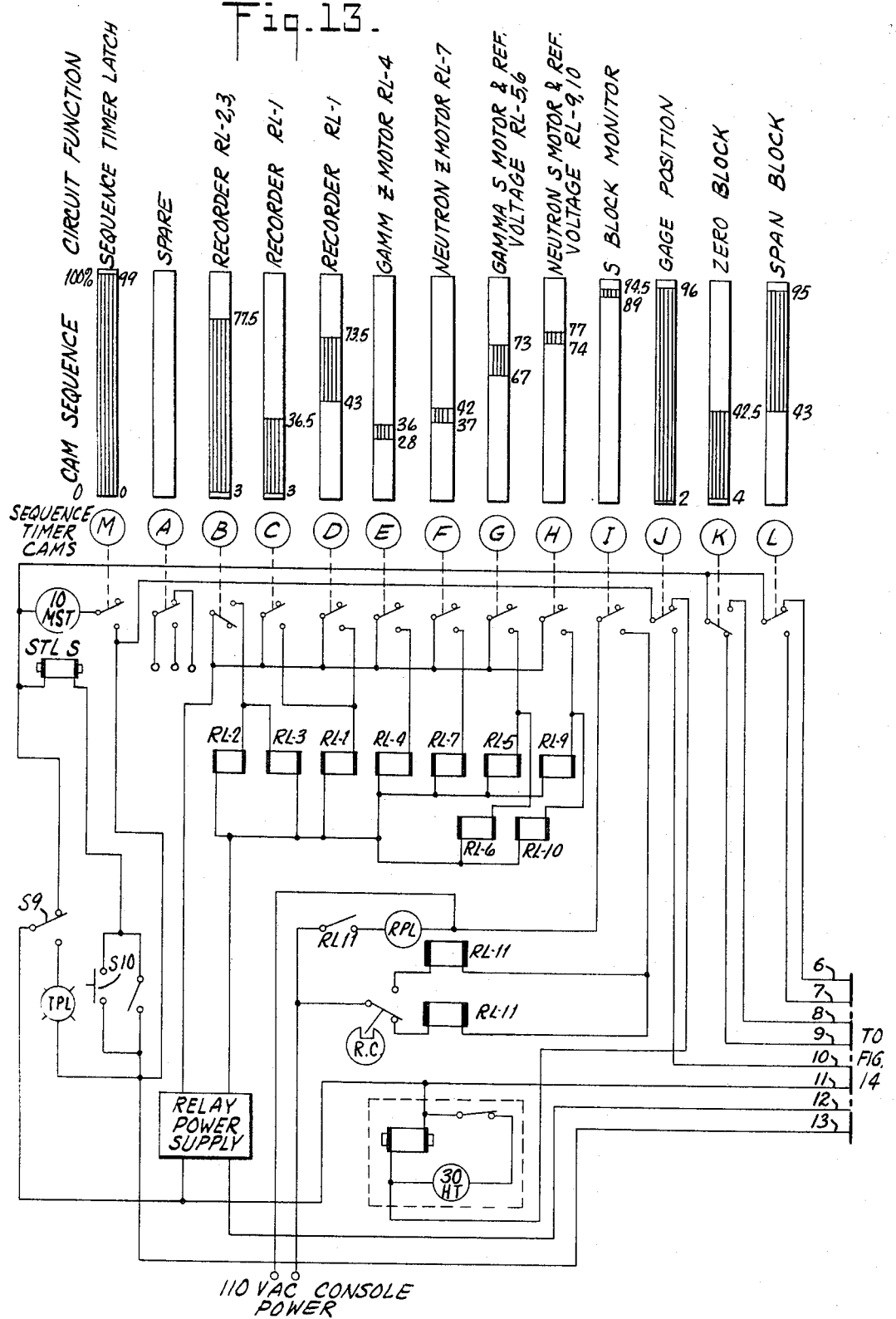
Figure 14:
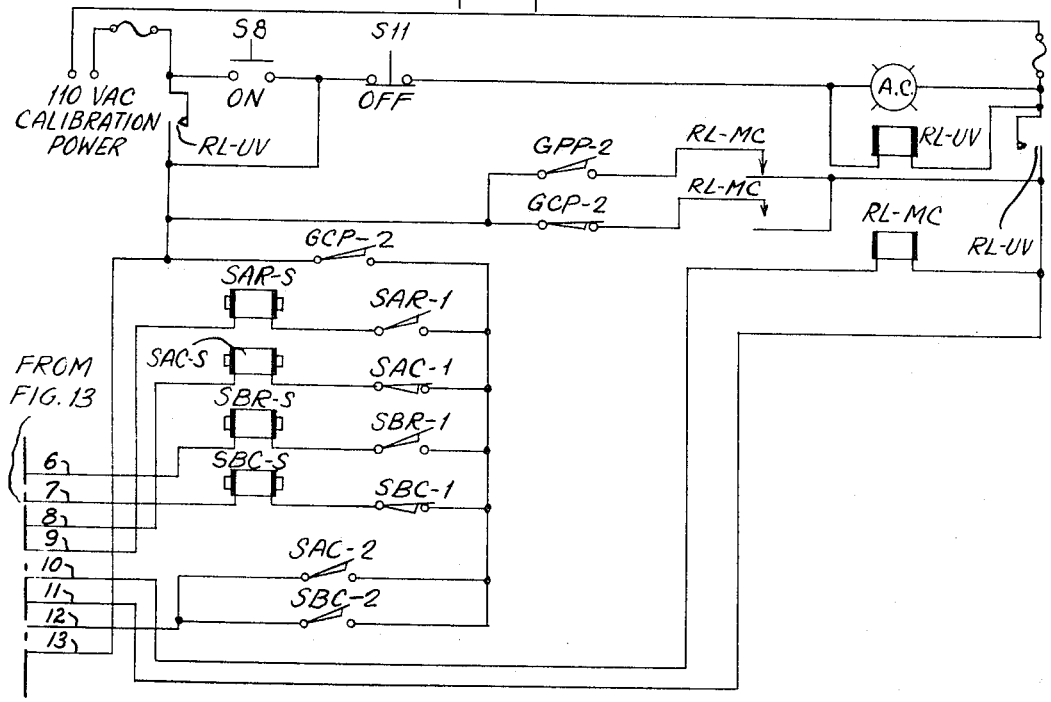
Figure 15:
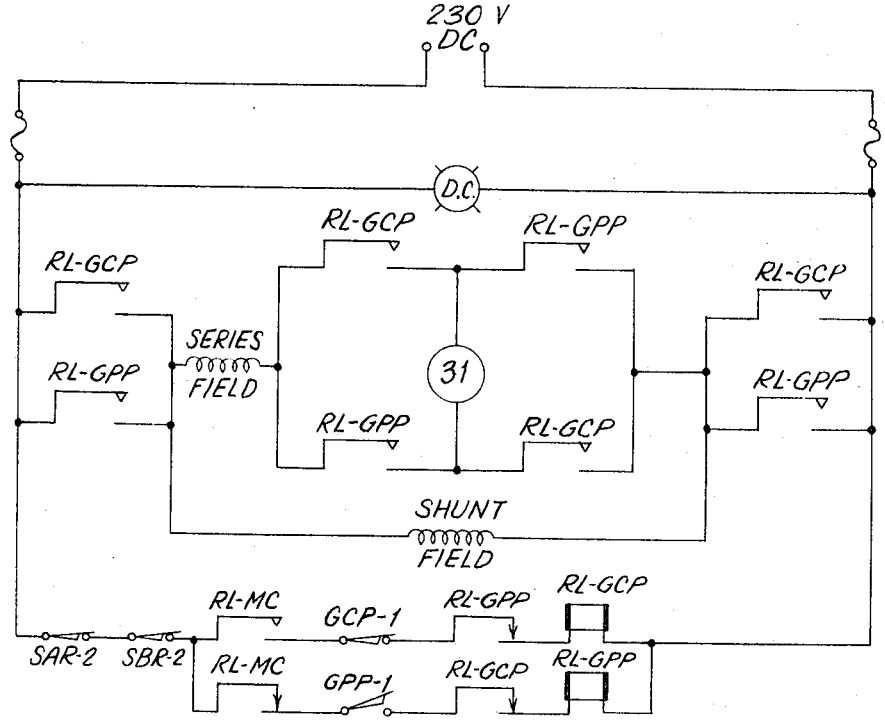
Figure 16:
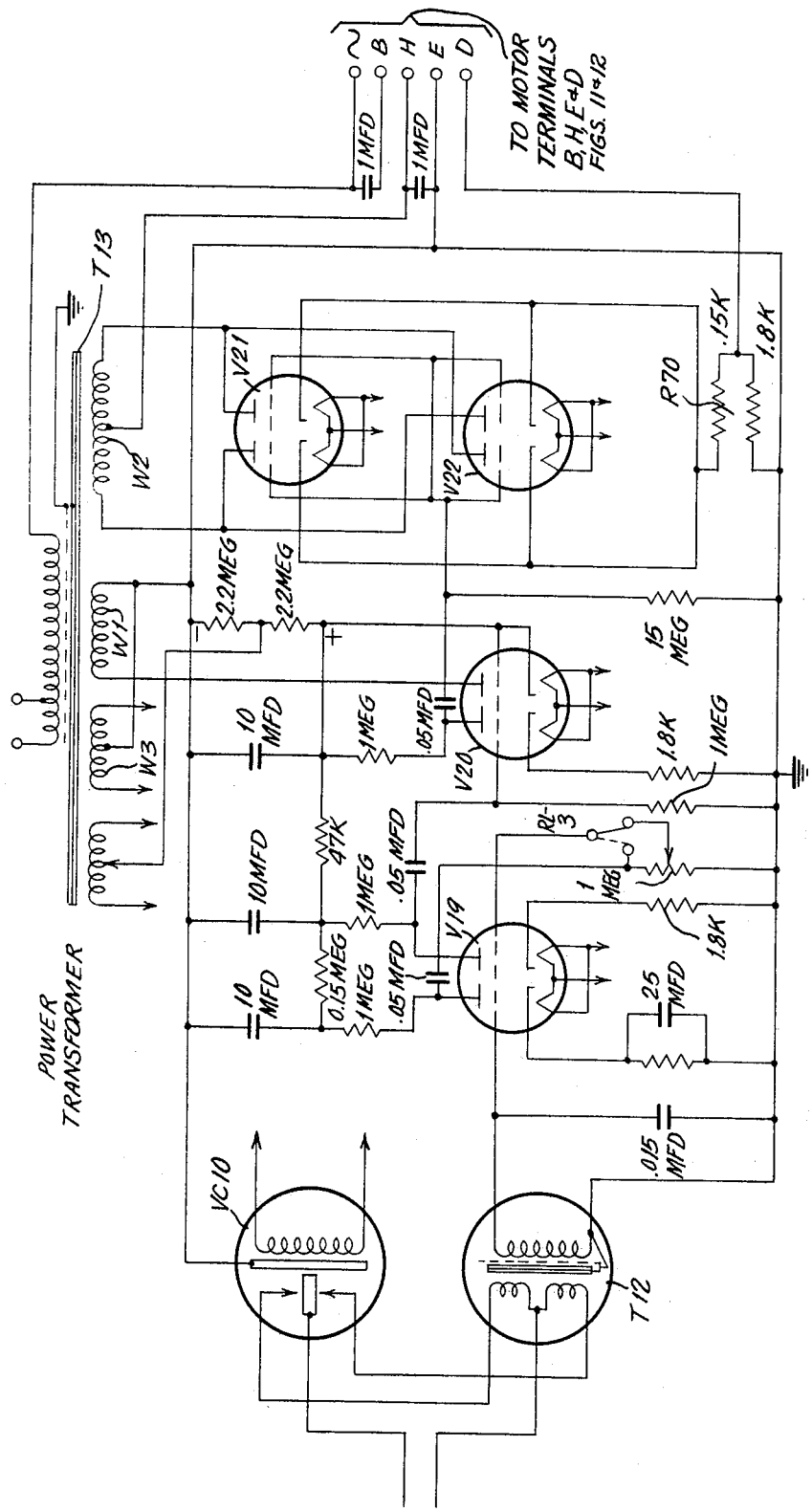

FIGS. 10, 11 and 12, taken together, comprise a schematic diagram of the gaging and calibrating circuits;

FIGS. 13 and 14, taken together, comprise a schematic diagram of the timing part of the calibration control circuits;

FIG. 15 is a schematic diagram of the carriage motor control circuits and circuits brought into play during gage calibration;

FIG. 16 is a wiring diagram of the recorder amplifier;

FIG. 17 is a schematic diagram of a voltage reference supply circuit;

FIG. 18 is a diagrammatic illustration of a recorder transmitting slide wire; and FIG. 19 is a schematic diagram of the relay power supply.

The invention herein is most readily understood by first considering the neutron detector and amplifier and the gamma detector and amplifier, as shown in FIGS. 10, 11 and 12.

As shown more clearly in FIG. 10, the neutron detector includes a group of six boron trifluoride proportional counter tubes V3–V8 having anodes and cathodes connected in parallel and energized through a resistor R9 of relatively large value from a unidirectional high-voltage power supply system. The latter is of conventional half-wave rectification type, and is regulated by inclusion in its output circuit of a series regulating resistor R8 and a shunt-connected regulating tube V–1. The resistor R9 provides constant-current limiting for the neutron detector tubes, and also provides for the latter a load resistor across which potential pulses are developed when the neutron detectors are subjected to slow neutron bombardment. The number of potential pulses developed by the neutron detector tubes across the resistor R9, in response to the slow neutron bombardment of the detector tubes, is proportional to the quantity of moisture in the sinter mix. Those slow neutrons which pass the detector tubes without being detected are reflected back to the neutron tubes by carbon blocks (not shown) mounted under the tubes, according to the structure to be described in detail at a later point herein. The neutron detector tubes V3–V8 are insensitive to fast neutrons, but do produce relatively small amplitude potential pulses across the resistor R9 in response to gamma radiation. As will presently be explained more fully, the effect of these small potential pulses is nullified by an amplitude limiting characteristic provided in the neutron amplifier hereinafter described.

The voltage pulses developed by the neutron detector tubes V3–V8, across the resistor R9, are coupled through a condenser C6 to the base electrode of a transistor Q1 included in the first stage of a conventional two-stage alternating-current transistor preamplifier. This amplifier is energized from a low-voltage full-wave rectifier system, shown at the top of FIG. 10, having its output voltage regulated by a Zener diode device D3.

The second amplifier stage includes a transistor Q2 operating as an emitter-follower arrangement by reason of the direct connection of its collector electrodes to the low-voltage energizing source and by use of an unbypassed resistor R16 in its emitter electrode circuit. The transistor preamplifier amplifies the potential pulses developed across the resistor R9 of the neutron detector tubes V3–V8, and the amplified potential pulses developed across the emitter resistor R16 of the second stage are coupled through a condenser C9 and a coaxial cable L10 to the primary winding of a transformer T3. The emitter resistor R16 has a value of resistance selected in conventional manner to match the output driving impedance of the preamplifier second transistor stage to the input impedance of the cable L10, which has its impedance also matched by the input impedance of the primary winding of the transformer T3.

The secondary winding of the transformer T3 is coupled through a condenser C10 (FIG. 11) to the base electrode of a transistor Q3, employed as the first stage of a two-stage neutron transistor amplifier, to apply the output potential pulses of the transformer T3 as negative-polarity pulses to the base electrode. This first transistor stage includes a collector load resistor comprised by the resistive element of a potentiometer R18 across which amplified positive-polarity potential pulses are developed. The base electrode of the transistor Q3 is cnoventionally biased as shown by a degenerative bias arrangement including a potential divider comprised by series-connected resistors R17 and R19 connected from the collector electrode of the transistor Q3 to ground. The transistor Q3 is protected from excessive-amplitude input voltage pulses by diode rectifier devices D5 and D6 connected with opposite conductive polarities across the secondary winding of the transformer T3.

The second stage of the neutron amplifier provides pulse amplification and wave shaping, and is a conventional monostable multivibrator which includes transistor devices Q4 and Q5 utilizing a common emitter resistor R24 and having the collector electrode of the transistor Q4 coupled through a condenser C13 to the base electrode of the transistor Q5. The base electrode of the transistor Q5 is biased by a resistor R25 to a potential which normally renders the transistor Q5 conductive, and the resultant potential produced across the emitter resistor R24 by the conductive current of the transistor Q5 biases the transistor Q4 to a normally non-conductive state. The multivibrator arrangement has its operational characteristics conventionally stabilized by use of a compensating diode rectifier D8 serially included in the degenerative base-bias potential divider comprised by the series resistors R21 and R22. The base electrode of the multivibrator transistor Q4 is coupled through a condenser C11 to the movable contact of the potentiometer R18, which may be manually adjusted to select a desired proportionate part of the amplified pulse voltages developed across the potentiometer resistive element by the transistor Q3 of the first amplifier stage. A diode rectifier device D7 is connected, with the conductive polarity shown, between the base electrode of the multivibrator transistor Q4 and ground potential to provide bias stabilization.

Manual adjustments of the adjustable contact of the potentiometer R18 enables the input circuit of the transistor Q4 to discriminate against the lower amplitude potential pulses produced by gamma radiation of the neutron detector tubes V3–V8. In particular, the pulse amplitude discrimination thus effected by adjustment of the potentiometer R18 is such that only the amplified neutron potential pulses developed by the neutron detector tubes V3–V8 have sufficient amplitude to operate the monostable multivibrator, comprising transistors Q4 and Q5, through a cycle of its operation.

Each cycle of operation of the transistor multivibrator just described produces a short-duration positive potential pulse across a load resistor R26 included in the collector electrode circuit of the transistor Q5. These potential pulses are coupled through a condenser C14 to a pulse integrating circuit comprised by a shunt-connected diode D9 and a series-connected diode D10, having the conductive polarities shown, and including an output-circuit shunt condenser C15 and shunt resistive potential divider comprised by a resistor R27 connected in series with the resistive element of a span potentiometer R28. The circuit values of this output circuit are selected to provide a time constant such that the potential ouput pulses of the multivibrator are so integrated in the output circuit as to produce across the potentiometer R28 an output unidirectional voltage having a value varying linearly with the rate of the neutron detector pulses applied through the input transformer T3 to the neutron transistor amplifier.

A proportionate part of this unidirectional potential, selected by the adjusted position of the movable contact of the span-potentiometer R28, is compared against a zero reference value of unidirectional potential selected by the adjusted position of a potentiometer R32 having its resistive element serially connected with a resistor R31 across the source of unidirectional voltage which energizes the neutron amplifier. In particular, the span-potentiometer and zero-reference potentiometer voltages have like polarity with respect to ground potential and are applied in series opposing relation with one another to the input circuit of a recorder amplifier RA–10. This input circuit includes an input transformer T12 having a secondary winding connected to the input circuit of the recorder amplifier RA–10 and having a center tapped primary winding with the center tap thereof connected through the normally closed contacts 1 and 2 of a calibrating relay RL1 to the movable contact of the span-potentiometer R28. The end terminals of the primary winding of the input transformer T12 are connected to the stationary contacts of a vibrator, these contacts being alternately engageable by the vibrator movable contact which is actuated by sixty cycle electrical energization of a vibrator energizing winding V10 from a low voltage energizing circuit of the recorder amplifier RA–10. The movable contact of the vibrator is connected through the normally closed contacts 1 and 2 of a calibrating relay RL–2 to the movable contact of a recorder slide wire potentiometer R35 having an end terminal connected as shown through normally closed contacts 4 and 5 of the relay RL–2 and normally closed contacts 1 and 2 of a calibrating relay RL–10 to the movable contact of the zero-reference potentiometer R–32.

The gamma detector includes a group of ten halogen quenched Geiger tubes V9–V18 (FIG. 12) which are individually energized through respective resistors R67–R76 from a regulated high voltage power supply system. This power supply system is of conventional half-wave rectification type having a series regulating resistor R64 and shunt regulating tube V2, and has its positive output terminal connected through the central conductor of a coaxial transmission line L11 to the resistors R67–R76 for positive energization of the centrally positioned coaxial electrode of the respective Geiger tubes V9–V18. The outer concentric electrodes of these tubes are connected in common to the negative terminal of the high voltage supply system through a series circuit which includes the outer concentric conductor of the transmission line L11 and a condenser C29, the latter having connected in parallel thereto a series resistive circuit including a resistor R61, the resistive element of a potentiometer R62, and a resistor R63. The Geiger tubes V12–V21 are physically positioned to survey approximately the same detection area as is surveyed by the neutron detection tubes V3–V8 earlier considered, and voltage pulses are produced across the condenser C29 and resistors R61–R63 by the Geiger tubes V9–V18 when the latter are subjected to gamma radiation. The number of voltage pulses so produced per unit of time is proportional to the amount of radiation passing through the sinter on the conveyor belt. Since the density of the sinter is substantially constant, the number of voltage pulses produced across the condenser C29 and resistors R61–R63 by the Geiger tubes V9–V18 is inversely proportional to the weight of the sinter on the conveyor belt.

The voltage pulses produced by the Geiger tubes V9–V18 are integrated by the resistive-capacitive network comprised by the condenser C29 and resistors R61–R63 to produce across the potentiometer R62 and resistor R63 a unidirectional voltage having a value proportional to the number of voltage pulses produced by the Geiger tubes V12–V21 per unit of time. The movable contact of the potentiometer R62 may be manually adjusted along the length of the potentiometer resistive element to select and apply to the base electrode of a transistor Q7 a fractional part of the unidirectional voltage developed by integration across the potentiometer R62 and resistor R63. The transistor Q7 is included with a transistor Q6 in a conventional two-stage compound-connected transistor amplifier in which the collector electrodes of the transistors Q6 and Q7 are energized through a resistor R60 from a conventional full-wave power supply system having its output regulated by a shunt Zener device D23 and a series resistor R77.

The emitter electrode of the transistor Q7 is directly connected to the base electrode of the transistor Q6, and the emitter electrode of the latter is connected to ground potential through a resistor R59 and a stabilizing series diode rectifier D22. The transistor Q6 operates as an emitter-follower amplifier stage to develop across the emitter resistor R59 and diode D22 the amplified unidirectional voltage applied to the base electrode of the transistor Q7, a condenser C28 being connected in shunt to the emitter resistor R59 and diode D22 to bypass any significant alternating-current frequency components appearing in the amplified output voltage.

The amplifier unidirectional output voltage of the transistor stage Q6 is supplied through an adjustable span resistor R58, normally closed contacts 1 and 2 of a calibration relay RL–6, and the normally closed contacts 4 and 5 of the relay RL–2 (FIG. 11) to one terminal of the resistive element of the recorder slide wire potentiometer R35 as shown. The opposite terminal of the resistive element of the potentiometer R35 has a zero reference voltage applied to it from the adjustable contact of a zero reference potentiometer R47 (FIG. 12) which is connected with a fixed resistor R46, an adjustable resistor R48, and parallel connected resistors R49–R51 across the source of unidirectional voltage which energizes the compound transistor amplifier just described. The zero reference voltage thus applied to one end terminal of the recorder slide wire potentiometer R35 has the same positive polarity with respect to ground potential as does the amplified unidirectional output voltage applied to the other terminal of the potentiometer R35 by the compound transistor amplifier comprised by the transistors Q6 and Q7. Thus the net voltage developed across the recorder slide wire potentiometer R35 corresponds to the prevailing difference between the zero reference voltage and the amplified output voltage of the gamma detector amplifier.

The neutron and gamma detectors just described are each initially calibrated for operation by a calibration system and calibration procedure which will now be briefly considered. As will be pointed out more fully hereinafter in considering the calibration system arrangement in greater detail, the neutron and gamma detectors are normally periodically automatically recalibrated but may be automatically recalibrated by manual initiation of a calibration cycle involving the calibration procedure now to be briefly considered. Each automatic calibration cycle causes the gage to be moved from its gaging position at the conveyor belt to the calibration position where the zero calibration block is automatically inserted into the radiation beam between the neutron and gamma sources and the respective neutron and gamma detectors.

After a brief time delay provided to allow all circuit voltages to reach stabilized values, calibration relays RL–2 and RL–3 are energized. The contacts 1 and 2 (FIG. 11) of the relay RL–2 thereupon open to interrupt the electrical circuit from the adjustable contact of the recorder slide wire potentiometer R35 to the movable contact of the vibrator VC10. The contacts 4 and 5 of the relay RL–2 open to remove from the resistive element of the recorder slide wire potentiometer R35 the amplified unidirectional output voltage of the gamma amplifier Q6, Q7. Contacts 2 and 3 and contacts 8 and 9 of the relay RL–2 close in preparation for the supply of a calibration value of voltage, filtered by a shunt connected condenser C40, to the input circuit of the amplifier RA10 through the input transformer T12 and vibrator VC10. The relay RL–3 (FIG. 13) has contacts which close to increase the gain of the amplifier RA10 during the calibration cycle as will be explained hereinafter in connection with the arrangement of the amplifier; contacts 1 and 2 and contacts 4 and 5 of the relay RL–3 open to deenergize a motor M1 which is normally energized by the output circuit of the amplifier RA10 to effect adjustments of the setting of the movable contact of the recorder slide wire potentiometer R35.

A calibration relay RL–1 (FIG. 13) is also energized at this time, and its contacts 1 and 2 (FIG. 11) open to remove the energization of the amplifier input transformer T12 by the span potentiometer R28 of the neutron detector. The contacts 2 and 3 of the relay RL–1 close to apply the zero reference voltage of the potentiometer R47 to the center tap of the amplifier input transformer T12, thus energizing the input transformer according to the difference between the prevailing value of a zero reference voltage of the potentiometer R47 and the prevailing amplified unidirectional output voltage of the gamma compound transistor amplifier Q6, Q7. A calibration relay RL–4 (FIG. 13) is then energized to close its contacts 2 and 3 and its contacts 5 and 6 (FIG. 12) to energize a motor M2 which effects adjustment of the movable contact of the zero reference potentiometer R47.

The energization of the motor M2 is accomplished by the amplifier RA10, which is energized at this time by the difference in the value of zero reference voltage supplied by the potentiometer R47 and the amplified unidirectional output voltage of the gamma amplifier Q6 and Q7 having effectively reduced value at this time by reason of the positioning of the zero calibration block in the radiation beam between the gamma detector and the gamma radiation source. This energization of the motor M2 positions the movable contact of the zero reference potentiometer R47 until the zero reference voltage has the same value as the prevailing amplified output voltage of the gamma transistor amplifier Q6, Q7.

The calibration relays RL–1 and RL–4 are now deenergized, the latter deenergizing the motor M2. A calibration relay RL–7 (FIG. 13) is next energized to close its contacts 2 and 3 and its contacts 5 and 6 (FIG. 11) and thus effect energization of a motor M3 from the output of the amplifier RA10. The deenergization of the relay RL–1 effects the closure of its contacts 1 and 2 and the opening of its contacts 2 and 3, whereby the zero reference output voltage of the potentiometer R47 is removed from the amplifier input transformer T12 and the amplified unidirectional voltage of the span potentiometer R28 is now applied to the amplifier input transformer T12 in series with the zero reference voltage of the potentiometer R32. The motor M3 adjusts the movable contact of the zero reference potentiometer R32 until the zero reference voltage has the same value as the unidirectional potential supplied by the span potentiometer R28, the latter potential having reduced value at this time by reason of the positioning of the zero calibration block in the radiation beam between the neutron source and neutron detector. The calibration relay RL–7 is then deenergized to deenergize the motor M3.

The zero calibration block is now withdrawn and the span calibration block is inserted in the radiation beam between the neutron and gamma radiation sources and the respective neutron and gamma detectors. As earlier mentioned, the span calibration block slows down neutrons and attenuates gamma rays in the same manner as would be effected by a normal weight of sinter mix carried by the conveyor belt and containing a normal amount of moisture. After a short time delay automatically provided to allow all circuit voltages to reach stabilized values, the calibration relay RL–1 is again energized to open its contacts 1 and 2 and to close its contacts 2 and 3. Calibration relays RL–5 and RL–6 are now energized. The normally closed contacts 1 and 2 (FIG. 12) of the relay RL–6 open and its normally open contacts 5 and 6, 2 and 3, and 7 and 8, close to supply through parallel-connected resistors R52 and R53 and now closed contacts 2 and 3 of the relay RL–1 to the amplifier input transformer T12 a calibration voltage supplied from a voltage reference supply source (FIG. 17). The latter is of conventional arrangement, and of the full-wave rectifier type, except that it is doubly stabilized by a first Zener device D15 (FIG. 17) and by a second Zener device D16 and series stabilizing resistors R38 and R39.

The calibrating relay RL–5 when energized closes its normally open contacts 2 and 3 and 5 and 6 (FIG. 12) to energize a motor M4 which adjusts the movable shorting contact of the adjustable span resistor R58. The motor M4 is thereupon energized by the amplifier RA10 in response to the combined calibration voltage, zero reference voltage of the potentiometer R47, and the amplified output voltage of the gamma amplifier applied at this time to the amplifier input transformer T12, so that the value of the span resistor R58 is adjusted until the unidirectional output voltage of the gamma transistor amplifier Q6, Q7 plus the reference voltage supplied from the reference supply system is equal to the zero reference voltage.

The calibration relays RL–1, RL–5 and RL–6 are then deenergized and the calibration relays RL–9 and RL–10 are now energized. The contacts 2 and 3 (FIG. 11) of the relay RL–1 thereupon open and the contacts 1 and 2 of this relay now close to couple the amplifier input transformer T12 to the neutron span potentiometer R28. At the same time, the normally closed contacts 1 and 2 (FIG. 11) of the relay RL–10 open and its contacts 8 and 9 and contacts 2 and 3 close to supply a calibration reference voltage from the voltage reference supply system in series with the opposed polarity voltages of the zero reference potentiometer R32 and the span potentiometer R28. The relay RL9 contacts 2 and 3 and 5 and 6 (FIG. 11) now close to energize a motor M5 from the output circuit of the recorder amplifier RA10. The motor M5 adjusts the movable contact of the span potentiometer R28 until the unidirectional potential supplied from the span potentiometer to the input circuit transformer T12 has a value equal to the calibration reference voltage, plus the zero reference voltage. The calibration relays RL–9 and RL–10 are then deenergized as are the calibration relays RL–2, RL–3 and RL–8.

The neutron and gamma detectors thereupon operate in normal manner to allow the gage to measure the span calibration block. The recorder indicator position is now monitored after a short delay interval to allow all circuit voltages to stabilize. If the gage has not been properly calibrated on this initial calibration cycle, a "recalibrate" pilot light will be illuminated and a calibration procedure should be manually initiated once again to effect converging adjustments of the neutron zero reference potentiometer R32, the gamma zero reference potentiometer R47, the neutron span potentiometer R28, and the gamma span potentiometer R58. As many such recalibration cycles should be manually effected during initial adjustments of the gage as may be required to cause the "recalibrate" pilot light of the automatic calibration system to remain unilluminated at the end of a calibration cycle and thereby indicate that the system is now properly calibrated.

When the neutron and gamma detectors are properly calibrated by the calibration procedure just described, no unidirectional voltage is applied to the contacts of vibrator VC10 and input transformer T12, so that no alternating voltage is applied to the recorder amplifier RA10. The reason for this will be evident from a brief review of the results accomplished by each calibrating procedure step. The adjustment of the gamma detector zero reference potentiometer R47 by the motor M2 with the zero calibration block in the radiation beam to the gamma detector results in the supply to the recorder slide wire potentiometer R35 of a zero potential corresponding to the condition of any empty conveyor belt.

The setting of the gamma detector span adjustable resistor R58 by the motor M4 when the span calibration block is inserted in the radiation beam to the gamma detector and by use of a calibration reference voltage from the reference voltage supply system results in a value of positive output voltage from the gamma detector compound transistor amplifier Q6, Q7, which, when added to the calibration voltage, equals the positive zero reference voltage supplied by the zero reference potentiometer R47 and corresponds to a normal weight of sinter mix on the conveyor belt. The setting of the neutron detector zero reference potentiometer R32 by the motor M3 with the zero calibration block in the beam between the neutron source and the neutron detector causes a zero potential to be supplied to the recorder slide wire potentiometer R35 corresponding to the condition of a dry conveyor belt (having hydrogen atoms always present in the rubber material of which it is fabricated) carrying only essentially dry sinter. The adjustment of the neutron detector span potentiometer R28 with the span calibration block in the beam between the neutron source and the neutron detector and by use of a reference voltage supplied from the reference voltage supply system causes the span potentiometer R28 to supply a positive voltage to the recorder slide wire potentiometer R35 which is equal to the zero reference voltage of the potentiometer R32 plus the calibration reference voltage for the condition that the conveyor belt carries sinter mix containing a normal amount of moisture.

Thus upon completion of calibration, a normal weight of sinter mix on the conveyor belt would result in opposing polarity voltages of the gamma detector zero reference potentiometer R47 and output voltage of the gamma detector transistor amplifier Q6, Q7 so that the gamma detector would accordingly supply a voltage equal to the calibration reference voltage to the recorder slide wire potentiometer R35. Also, for sinter mix containing a normal amount of moisture, opposed polarity unidirectional voltages would be supplied by the neutron detector zero reference potentiometer R32 and by the neutron detector span potentiometer R28, equal to the calibration reference voltage, to the vibrator VC10 and amplifier input transformer T12.

After the neutron and gamma detectors have been calibrated in the manner just described, the span calibration block is automatically withdrawn and the gage is automatically returned to its gaging position on the conveyor belt. So long as a normal weight of sinter mix having a normal amount of moisture is transported by the conveyor belt, the gamma detector and neutron detectors supply voltages equal to the calibration reference voltages to the slide wire, vibrator VC10 and amplifier input transformer T12. Assume, however, that a greater than normal weight of sinter material of normal moisture content is conveyed by the conveyor belt. This excess weight of sinter mix reduces the integral pulse output voltage of the gamma detector tubes V12-V21 and results in a reduction in the value of unidirectional output voltage of the gamma detector transistor amplifier Q6, Q7. The voltage of the gamma detector zero reference potentiometer R47 is now larger than the output voltage of the gamma deflector amplifier and to a small net positive potential is supplied by the zero reference potentiometer R47 to the recorder side wire potentiometer R35, and a unidirectional voltage is applied by the vibrator VC10 to the amplifier input transformer T12. The resulting alternating voltage thus applied to the recorded amplifier RA10 applies energization in such amplitude and phase to the motor M1 as to cause adjustment of the movable contact of the recorder slide wire potentiometer R35 to the right, as seen in FIG. 11, until a point is reached where a zero value of unidirectional voltage once more appears at the vibrator VC10 and amplifier input transformer T12. This new adjusted position of the recorder slide wire potentiometer R35 corresponds to a decrease in the percentage moisture by weight of the sinter mix and may be used to effect an automatic addition of water to the mix, if necessary, to restore the moisture content to the desired weight percentage. The slide wire R35 is coupled to a recorder transmitting slide wire R81 (FIG. 18) from which the voltage is taken by a wiper driven by the wiper shaft of the resistive device R35. The voltage so obtained is transmitted to the electric control unit of FIG. 1, the function of which will be described hereinafter.

It will be evident that should be the weight of sinter mix on the conveyor belt decrease to result in an increased value of unidirectional output voltage of the gamma detector, the result net unidirectional voltage now applied to the recorder slide wire potentiometer R35 will effect motor driven adjustment of the contact of the latter to a new position corresponding to the increased weight percentage of moisture. Here again the adjustment of the slide wire potentiometer R35 may be used to effect an automatic reduction in the amount of water added to the sinter mix again to restore the moisture content to a preselected weight percentage.

Assume now that the weight of sinter mix carried by the conveyor belt remains at a normal value but that the moisture content of the mix increases above normal value. This increased moisture content produces a greater quantity of slow neutrons so that the potential pulse rate of the neutron detector tubes V3-V8 correspondingly increases. This results in a larger value of positive unidirectional potential developed at the neutron span potentiometer R28. The net positive voltage now supplied to the vibrator VC10 and amplifier input transformer T12 results in an alternating voltage in the amplifier input circuit of such magnitude and phase as to cause the motor M1 to adjust the movable contact of the slide wire potentiometer R35 to the left as seen in FIG. 11. This direction of adjustment is the same as that earlier described for a decrease in weight of sinter mix as measured by the gamma detector and again indicates an increase in the weight percentage of moisture content of the sinter mix. This adjustment acordingly may be used automatically to reduce the amount of water added to the mix and thus maintain a desired value of weight percentage moisture content of the mix.

It will be evident that a decrease of the moisture content of the sinter mix carried by the conveyor belt reduces the positive unidirectional voltage of the neutron span potentiometer R28. The reduced net voltage supplied by the neutron amplifier to the vibrator VC10 and amplifier input transformer T12 causes the recorder amplifier RA10 so to energize the motor M1 as to adjust the slider of the slide wire potentiometer R35 to the right as seen in FIG. 11. This is the same direction of slide wire adjustment as earlier described for an increase of weight of sinter mix on the conveyor belt and again indicates a decrease in the weight percentage of moisture in the mix and may be used automatically to increase the quantity of water supplied to the mix automatically to maintain a desired weight percentage value of moisture content.

The circuit arrangement of the recorder amplifier RA10 is shown in FIG. 16. The amplifier is comprised by a conventional three-stage voltage amplifier each utilizing a triode section of vacuum tubes V19 and V20. Amplifier energization is provided by a conventional power transformer T13 having a high-voltage winding W1 connected to a conventional half-wave rectifier comprised by one anode and the grid-cathode electrodes of one triode section in the tube V20, as shown. The amplifier drives the parallel-connected grid electrodes of power tubes V21 and V22 which have anodes connected by common pairs to the end terminals of a motor energizing winding W2 on the amplifier transformer T13.

The transformer winding W2 has a center tap connected to one motor energizing output terminal H, the cathodes of the tubes V21 and V22 being connected in common to a cathode bias resistor R70 having an intermediate tap connected to a second motor energizing output terminal D. The vibrator energizing winding VC10 is energized from a low voltage winding W3 of the transformer T13. When a unidirectional voltage is applied between the vibrator movable contact 4 (FIG. 11) and the center tap of the amplifier input transformer T12, the vibrator applies this voltage alternately to the two halves of the primary winding of the input transformer and the secondary winding of the latter develops an alternating voltage of corresponding amplitude. This alternating voltage is amplified and renders the power tubes V21 and V22 conductive to provide a motor energizing alternating current of amplitude varying with the magnitude of the amplified alternating voltage. If the input unidirectional voltage renders the vibrator movable contact positive with respect to the center tap of the input transformer T12, the output current of the power tubes V21 and V22 has a given phase with relation to the alternating voltage supplied to the primary winding of the power transformer T13. The output current of the power tubes V21 and V22 has a phase opposite to the given phase, however, when the input unidirectional voltage renders the center tap of the input transformer T12 positive with respect to the movable contact of the vibrator. Thus the energizing current supplied by the power tubes V21 and V22 has an amplitude and phase varying with the magnitude and polarity of the unidirectional input voltage applied to the input transformer T12 and vibrator.

The power supply of FIG. 19 is a conventional full-wave rectifier circuit. It supplies the power required by the mercury relays used in the calibration control circuit. Note at the lower left of FIG. 13 that relay power is supplied through the calibration block limit switches, and through all chassis connectors in the console. This insures that the gage will not attempt to calibrate if the gage unit is not in the calibrate position or any connectors are not in place.

Components of the moisture gage are mounted on a transport assembly by which the source of radiation and the radiation detectors can be readily moved between a normal gaging position in association with a conveyor belt and a remote calibrating position. The transport assembly is shown in FIGS. 3 through 9 to which reference is now made. In these figures, a transport frame and a carriage structure are generally designated by the reference numerals 10 and 12, respectively. The assembly is shown in association with a conveyor belt 14 which has thereon a load of moisture-containing material which for the purpose of this specification may be deemed to be a sinter material used in the production of iron and steel. The transport frame 10 extends under the conveyor belt 14, as shown in FIGS. 4 and 5, and it extends laterally to one side of the belt to permit the carriage 12 to move from a position in proximity to the conveyor belt to a remote position therefrom, i.e., to the left as viewed in FIG. 4.

Figure 6:
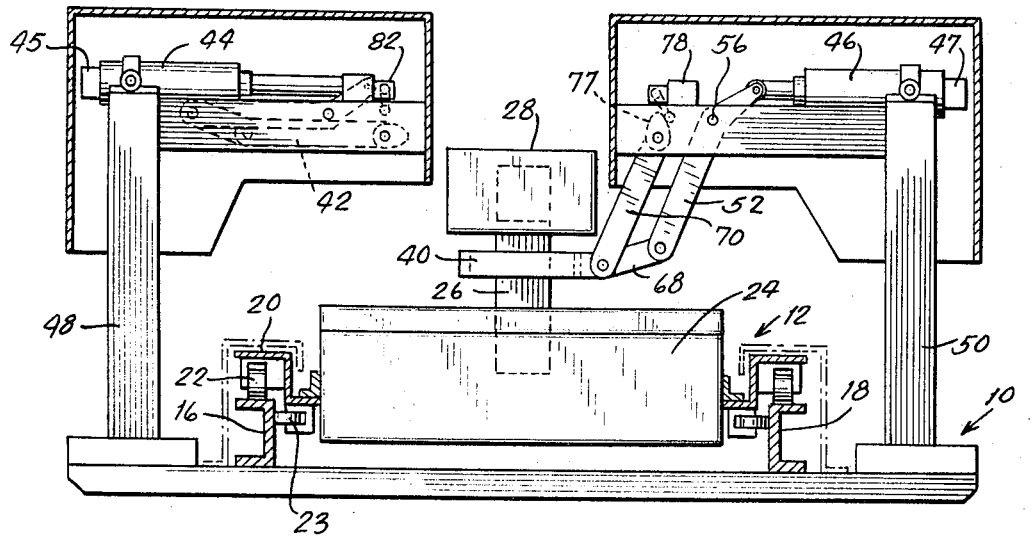
FIG. 6 is a cross-sectional view on line 6—6 of FIG. 5.
Figure 7:
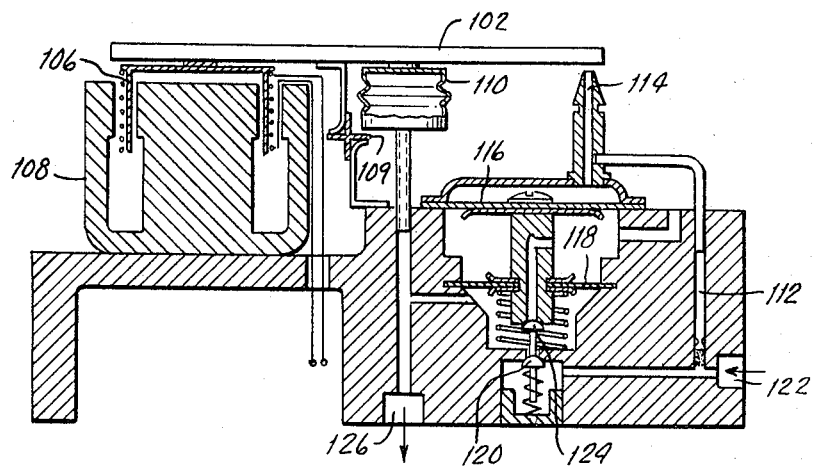
FIG. 7 is a cross-sectional view of a simplified functional representation of an electro-pneumatic converter used in the control system.

As best shown in the end view of FIG. 6, the transport frame provides a pair of laterally spaced tracks 16 and 18. These tracks are adapted to support for rolling contact theron a carriage frame 20 supported on a plurality of rollers 22. Lateral movement of the carriage frame 20 in respect to the tracks 16 and 18 is limited by a plurality of rollers 23 which are mounted on vertical axes to engage the inner face of the tracks 16 and 18. The carriage frame 20 is in the form of an annular structure adapted to receive and hold therein a closed receptacle 24 in which the radiation detection tubes V3–V8 and V9–V18 are housed together with such additional electrical elements as are necessarily associated with the tubes.

Mounted for movement with the carriage frame 20 is a C-frame 26 to which is attached a radiation source holder 28. This design allows withdrawal of the assembly from the conveyor belt for calibration without a belt shut down. The radiation source 28 mounted on the upper arm of the C-arm contains five (5) ten millicurie radium beryllium (Ra-Be) sources which provide both fast neutrons and gamma rays. The sources are surrounded within the holder 28 by lead shielding for safety. A narrow slot (not shown) is provided in the shield in the bottom of the holder 28 to direct the radiation through the sinter mix and conveyor belt to the detectors in the casing 24.

The cradle 12 can be moved to either the gaging position where the radiation source 28 overlies the load on the conveyor belt 14 and the detectors extend directly thereunder below the conveyor (FIG. 4) or to the calibrate position (FIG. 5). The carriage 12 can be moved between the gaging and the calibrate position by means of an electrically operated chain drive mechanism shown best in FIG. 9. For calibration, the carriage 20 and the C-arm 26 are retracted to the right (FIG. 9) to the calibrate position. This is accomplished by a drive motor 31 (FIGS. 3 and 5) which is mounted on the transport frame 10.

As best shown in FIG. 9, the carriage frame 20 has attached at opposite ends thereof a sprocket chain 32. This chain is trained about a pair of sprocket wheels 34 and 36 of which the sprocket wheel 36 is driven by the motor 31 through an interposed speed reduction gear assembly 38. It can be thus be seen that as the motor 31, which is reversible, is operated in one direction, the carriage 12 will be moved along the rails 16 and 18 in one direction and when the motor is reversed, it will be moved along the rails in the opposite direction.

Figure 3:
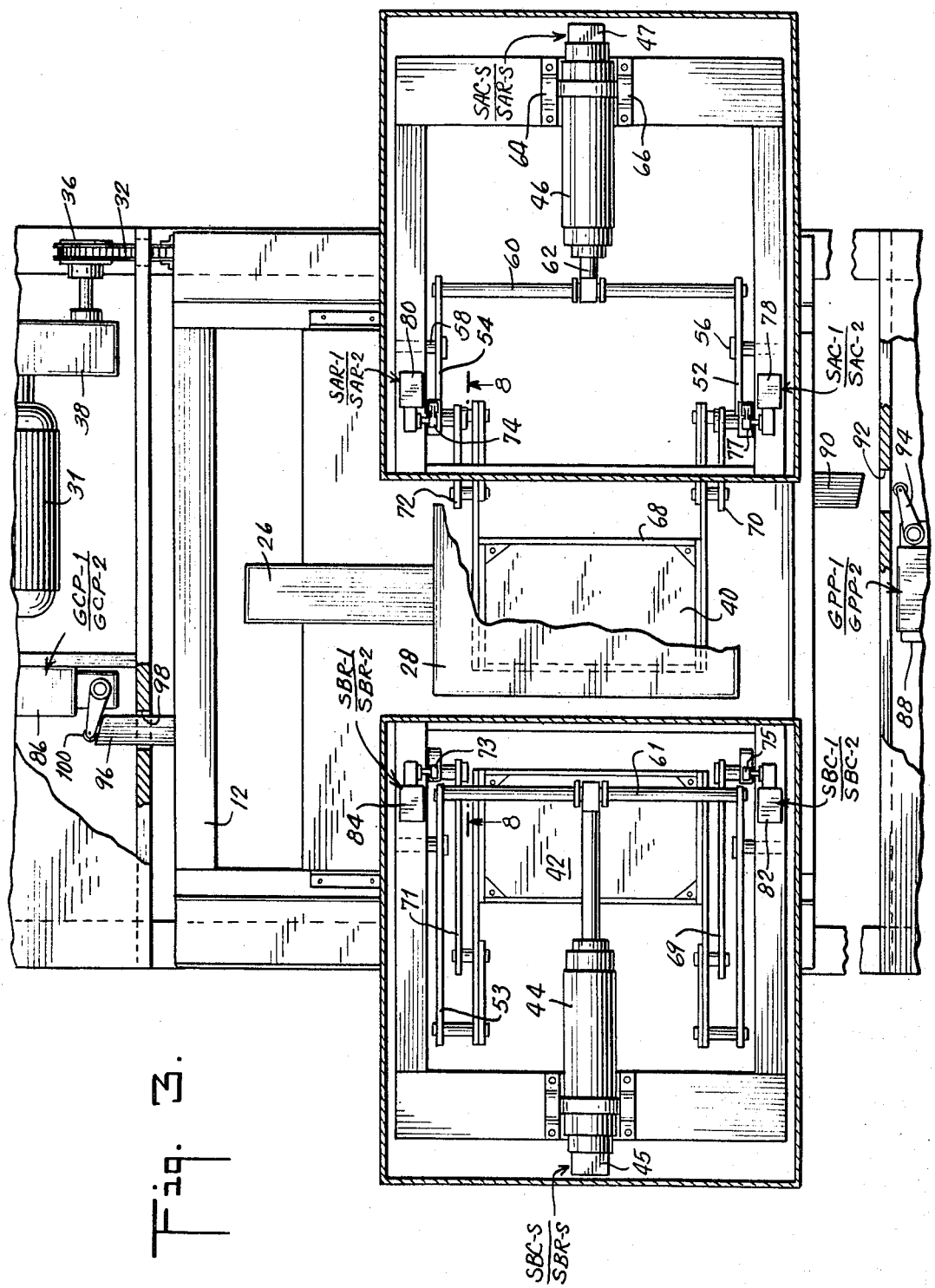
FIG. 3 is a plan view of the gaging and calibrating assembly with covers removed or broken away to show underlying structure.
Figure 4:
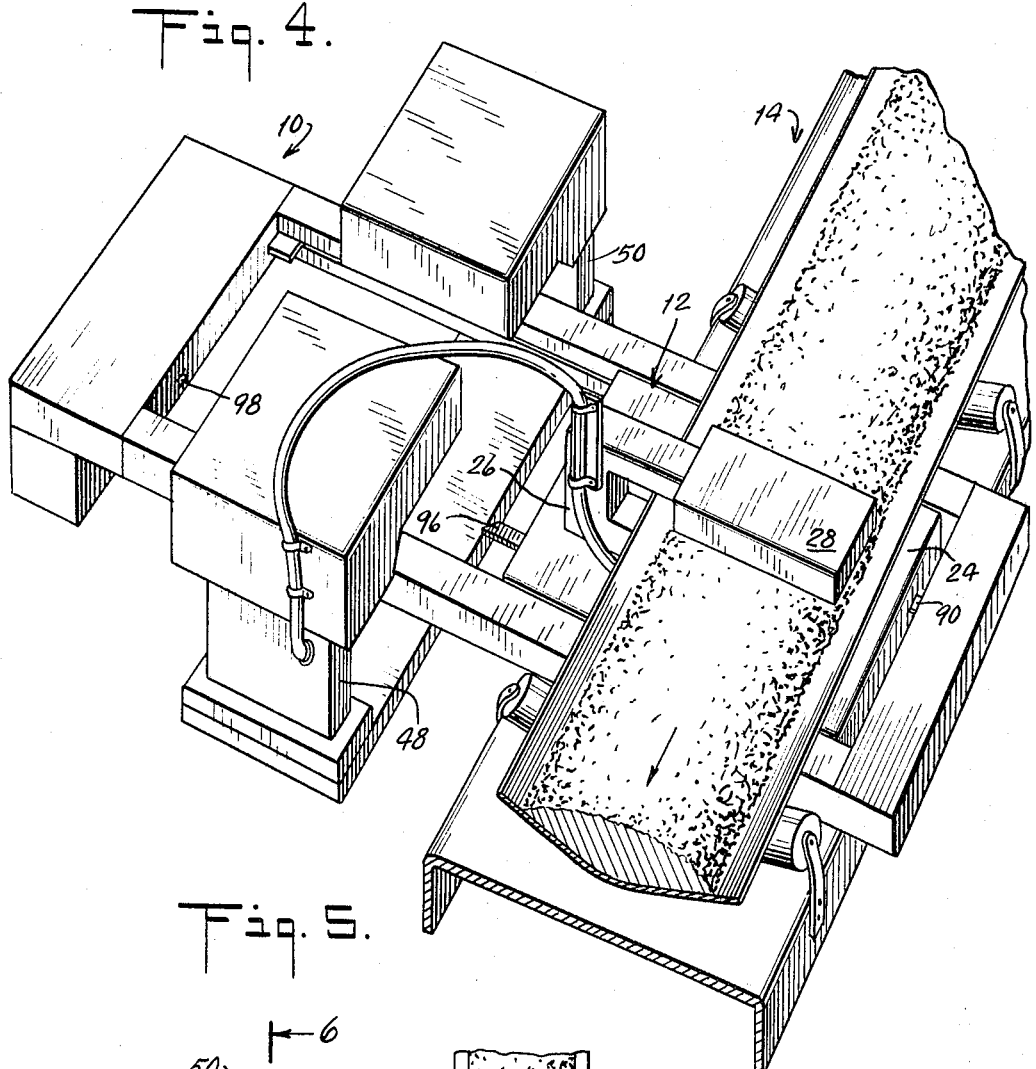
FIG. 4 is a perspective view of the moisture gaging and calibration assembly in association with a section of a conveyor belt loaded with moisture bearing material.
Figure 5:
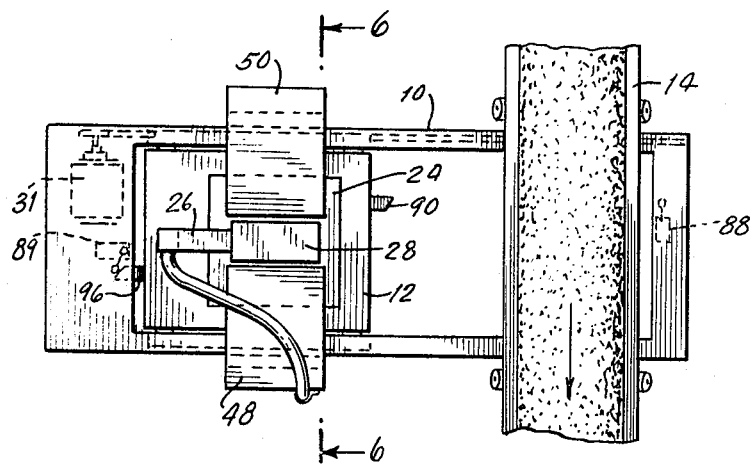
FIG. 5 is a plan view of the mechanism of FIG. 4, showing, however, the mechanism disposed in the gage calibrating position.

When the carriage 12 and the C-arm 26 are moved to the left, as shown in FIG. 4, the radiation source holder 28 and the detectors 24 are in proximity to a pair of calibration blocks 40 and 42 (FIGS. 3 and 6). These are the blocks to which reference was made in the foregoing description of the gaging circuit. These blocks are so positioned and supported as to be movable into and out of the radiation beam from the source holder 28. Movement of the calibration blocks 40 and 42 is controlled by individual electrically interlocked pneumatic cylinders 44 and 46. Both calibration blocks utilize combinations of several materials. All calibration block materials attenuate the gamma rays to some degree. Some of the calibration block materials also slow down fast neutrons. The proper combination of materials in the calibration blocks provides both the zero and span calibration points.

The zero calibration block 40 slows down neutrons and attenuates gamma rays the same as an empty conveyor belt. The moisture and density circuit outputs are adjusted to zero when this calibration block is in the radiation beam, as above described. This compensates for the hydrogen atoms present in the rubber conveyor belt and assures that the gage will indicate zero moisture when dry sinter is on the belt.

The span calibration block 42 slows down neutrons and attenuates gamma rays the same as a belt carrying sinter mix containing a normal amount of moisture. With the span calibration block 42 in place, the moisture and density circuit outputs are adjusted to obtain the proper recorder reading. This guarantees that the recorder range will remain constant.

The calibration cycle consists of moving the gage from the gaging position in association with the conveyor belt (FIG. 4) to the calibrate position in association with the calibration blocks (FIG. 5), the sequenced insertion of the calibration blocks, and the return of the gage to the gaging position at the belt. The sequence of events during the calibration cycle are controlled by a sequence timer about which more will be said at a later point.

The pneumatic cylinders 44 and 46 are controlled, respectively, by a pair of electromagnetic valves 45 and 47 of conventional structure and which have been illustrated in a generally diagrammatic way in FIGS. 3 and 6. The transport frame 10 supports a pair of upstanding frame structures 48 and 50 mounting, respectively, at the top thereof the pneumatic cylinders 44 and 46. Each of the cylinders is adapted to operate a linkage system designed generally as a parallelogram by which the calibration blocks 40 and 42 are lowered into operative position where they intersect the radiation beam, and raised into a retracted or inoperative position.

FIGS. 3 and 6 most clearly show the organization of the linkage system. The calibration blocks 40 and 42 are manipulated by identical linkage systems. Therefore, we will confine ourselves to a specific description of the linkage shown at the right in FIGS. 3 and 6. A pair of crank levers 52 and 54 (see FIG. 3) are mounted for rocking motion, respectively, on a pair of pivot pins 56 and 58 (FIG. 3) extending inwardly from the upstanding frame structure 50. The crank levers 52 and 54 are connected at their inner ends by means of a cross-head 60 (FIG. 3) to which is connected the piston rod 62 of the pneumatic cylinder 46. The pneumatic cylinder 46 is mounted in a pair of pillow blocks 64 and 66 to permit it to rock to a limited extent.

The outer ends of the crank levers 52 and 54 are connected to a calibration block holder 68. The calibration block holder 68 is connected at opposite sides of the upstanding frame structure 50 by means of links 70 and 72 (see FIG. 3); these links being pivoted at one end on the calibration block holder 68 and at their other ends in the side members of the upstanding frame structure 50. The crank levers and the associated links are substantially parallel.

As the links 70 and 72 are moved from one position to another by the cylinder 46, they rotate cams 77 and 74, respectively, which are adapted to operate respective operating arms of associated circuit breakers 78 and 80 as better shown in FIG. 8, each having therein double-acting contacts. The switch structure 78 contains the zero calibrate limit switch contacts SAC–1 and SAC–2. The switch 80 contains the zero calibrate return limit switch contacts SAR–1 and SAR–2.

At the opposite side of the assembly, the links 69 and 71 correspond to their counterparts 70 and 72. When the links 69 and 71 are operated, cams 75 and 73 (FIG. 3), respectively, will rotate therewith to operate their respectively associated circuit breakers 82 and 84. The switch 82 has therein the span calibrate limit switch contacts SBC–1 and SBC–2, while the switch 84 contains the span calibrate return limit switch contacts SBR–1 and SBR–2.

The pneumatic cylinder 44 is under control of an electro-mechanical valve 45 which, in turn, is operated by a pair of solenoids SBC–S and SBR–S (FIGS. 3 and 14). By the same token, the pneumatic cylinder 46 is under control of a similar electro-mechanical valve 47 operated by a pair of solenoids SAC–S and SAR–S (FIGS. 3 and 14).

By reference to FIGS. 14 and 15, it can be seen that the contacts SAR–1 are normally open, the contacts SAR–2 are normally closed. The contacts SAC–1 are normally closed, the contacts SAC–2 are normally open. The contacts SBC–1 are normally closed, the contacts SBC–2 are normally open. The contacts SBR–1 are normally open, and the contacts SBR–2 are normally closed.

When the solenoid SBC–S is energized, it will condition the ports of the valve 45 such that fluid pressure is admitted to the inner face of the piston. This will serve to draw the cross-head 61 toward the cylinder 44 with the result that the span block is lowered and projected into the path of the radiation beam. The energization of the solenoid SBR–S will reverse operation of the fluid cylinder 44 and retract the span block 42 into the position shown in FIG. 6. When the solenoid SAC–S is energized, it will condition the ports of the valve 47 to admit fluid pressure to the inner face of the piston within the cylinder 46 and draw the piston rod 62 into the cylinder, such that the cross-head 60 (FIG. 3) is drawn outwardly. This will lower and project the zero calibration block 40 into the position shown in FIG. 3, wherein it lies in the path of the radiation beam. When the solenoid SAR–S is energized, it will so condition the ports of the valve 47 to admit fluid pressure to the outer face of the piston within the cylinder 64 and cause the zero calibration block 40 to be raised and retracted to its inoperative position.

Attention should be called to the limit switches 86 and 88 (FIG. 3) which are located at opposite ends of the transport frame 10. The carriage frame 12 has projecting therefrom a forwardly extending switch operating finger 90 adapted to pass through an aperture 92 of the transport frame and into contact with the operator 94 of the switch 88. The opposite end of the carriage has a similar finger 96 adapted to pass through an aperture 98 of the transport frame and into contact with the operator 100 of the switch 86. Since in FIG. 3, the carriage 12 is in this calibrate position, the operator 96 is in contact with the switch operator 100. When the position of the carriage 12 is reversed, i.e. moved to its normal sinter mix gaging position, the operating finger 90 will be in contact with the switch operator 94 at the front of the transport frame. The switch 86 contains the gage calibrate position contacts GCP–1 and GCP–2, while the switch 88 contains the gage production position contacts GPP–1 and GPP–2.

With the foregoing in mind, it will be appropriate to examine more closely the control circuits of FIGS. 13 through 15. The several relays by which the mechanism is controlled are under the influence of a sequence timer consisting of a plurality of cam segments diagrammatically illustrated at the top of FIG. 13 in conjunction with the circuits through which the control relays are energized. A conventional thirty-hour timer, 30HT (FIG. 13), is used to initiate the calibration cycle. Although the timer is adjustable from one to thirty hours, the normal setting ranges from six to eight hours. At the completion of the preset time interval, the thirty-hour timer sends a pulse to start the calibration cam sequence timer, and then resets itself. On receiving a pulse from the thirty-hour timer, for automatic timing, or from the calibration pushbutton S10 (FIG. 13), for manual operation, the sequence cams M, A, B, C, D etc. will initiate and control all the functions of the calibration cycle. The timer is of conventional construction and is composed of a synchronous motor, a gear reducer and the necessary number of cam operated switches.

At the beginning of the cycle, the cam M closes its switch. This energizes the sequence timer motor 10MST which produces a ten minute sequence and rotates the cams A, M, B, C, D etc. one full revolution and then stops. At 2° of the cycle, the cam J closes its contact and energizes the motor control relay RL–MC (FIG. 14). The gage position motor 31 (FIG. 15) now begins to operate and drives the carriage 12 to the calibrate position. The carriage is stopped by opening of the gage calibrate position limit switch GCP–1 by the switch operating projection 96 on the carriage frame (FIG. 3). The gage calibrate position limit switch GCP–2 is closed to supply power to the relay power supply.

At 4° of the cycle, the sequence cam K will close its contact. This results in the energization of the zero calibrate pneumatic solenoid SAC–S. The solenoid SAC–S conditions the valve 47 to insert the zero calibration block 40 into the radiation beam. The cam 77 will open the zero calibrate limit switch SAC–1, while the cam 74 will close the zero return limit switch SAR–1. The sample A calibrate limit switch SAC–2 is also closed by the cam 77, completing the circuit supplying power to the relay power supply. The zero return limit switch SAR–2 (FIG. 15) is opened by the cam 74, insuring that the gage cannot be moved with the zero calibrate block 40 in its lowered or operative position.

At 42.5° of the cycle, the cam K opens its contact thereby energizing the zero calibrate return pneumatic solenoid SAR–S. When this solenoid is operated, its operation is effective to condition the valve 47 to retract the zero calibration block 40. The zero calibration limit switch SAC–1 is opened by the cam 77, the zero return limit switch SAR–1 is opened by the cam 74, the zero calibrate limit switch SAC–2 is opened by the cam 77 and the zero calibrate return limit switch SAR-2 is closed by the cam 74.

At 43° of the cycle, the cam L will close its contact to energize the span calibration pneumatic solenoid SBC-S. Energization of this solenoid effectively conditions the valve 45 to insert the span calibration block 42 into the radiation beam. The cam 75 opens the span calibration limit switch SCB-1 and closes the span calibration limit switch SCB-2 to complete the circuit supplying the power to the relay power supply. The cam 73 closes the span calibrate B return limit switch SBR-1 while opening the span calibrate return limit switch SBR-2.

At 89° of the cycle, the cam I will close its contact to energize the relay RL-11. When the relay RL-11 is energized, it will turn on the recalibrate pilot light RPL (FIG. 13) if the recorder is reading outside the band from 77% to 83% of full scale. If the recording is within this band, the relay will unlatch. The recorder cam RC (FIG. 13) controls the location and the width of the band.

At 94.5° of the cycle, the contact of the cam I will open thus deenergizing the relay RL-11. When the relay is thus deenergized, it will leave the contact in the signal lamp circuit in its previous open state.

At 95° of the cycle, the cam L will open its contact thus energizing the span calibrate return pneumatic solenoid SBR-S to condition the valve 45 and to retract the span calibration block 42. When this occurs, the span calibration limit switch SBC-1 is closed by the cam 75 and the span calibration limit switch SBC-2 is opened. The span calibrate return limit switch SBR-1 is opened and the span calibrate return limit switch SBR-2 is closed by the cam 73.

At 96° of the cycle, the cam J opens its contacts thereby deenergizing the relay RLMC. The gage position motor 31 drives the carriage 12 to its normal gaging position where it is stopped by closure of the gage production position limit switch GPP-1 by the switch operating projection 90 (FIG. 3). At this point, the gage calibrate position limit switch GCP-2 is opened.

At 99° of the cycle, the cam M opens its contacts thereby deenergizing the sequence timer motor 10MST. When this motor is deenergized, it stops all the cams in their normal sinter mix gaging position.

Figure 1:
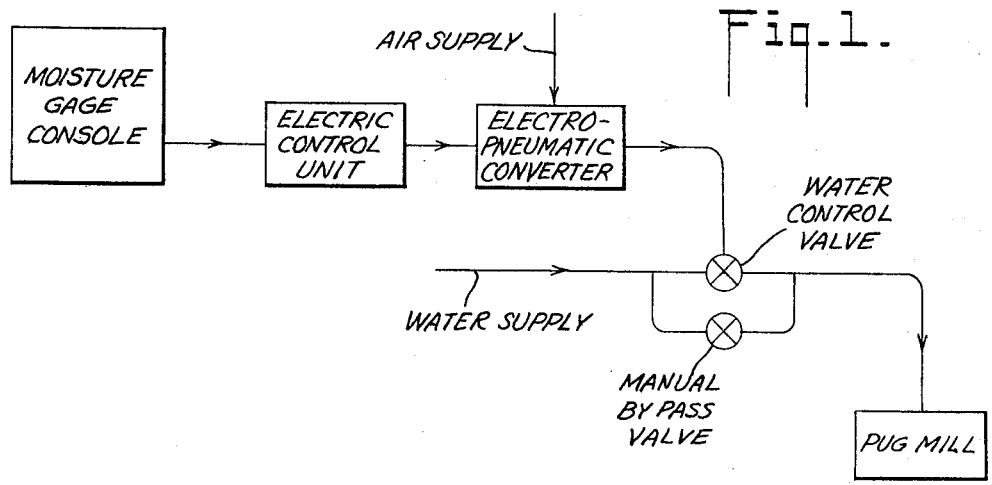
FIG. 1 is a block diagram of the moisture control system for the nuclear moisture gage.
Figure 2:
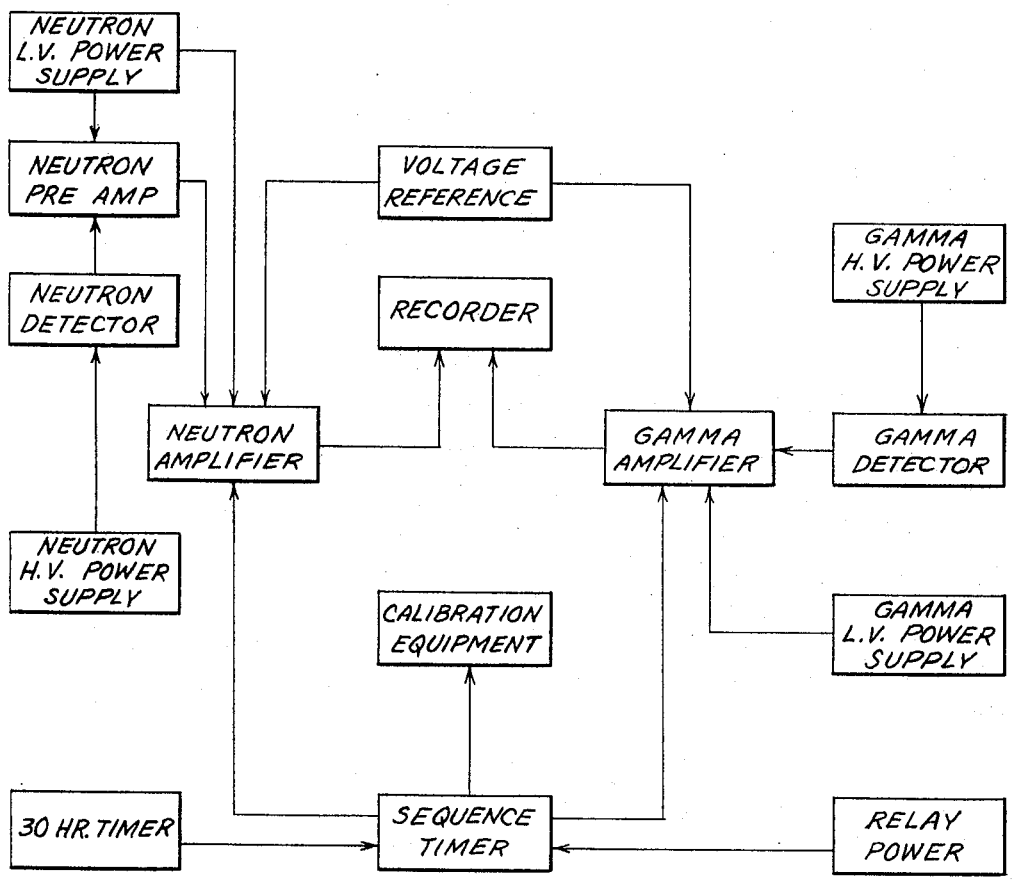
FIG. 2 is a block diagram of the nuclear moisture gage.

A voltage is taken from the recorder transmitting slide wire R81 of FIG. 18 and is transmitted to an electric control unit (FIG. 1). This unit is a conventional Leeds & Northrop Series 60 C.A.T. Control Unit which automatically produces an output current proportional, in the range 0 to 5 milliamperes, to the input requirement of the controlled process. The voltage from the electric control unit is transmitted to an electro-pneumatic converter which converts the current from the control unit to a corresponding output air pressure. A suitable device of this nature is also manufactured and sold by Leeds & Northrop Company and includes an air operated valve which is controlled by the output pressure of the electro-pneumatic converter. The electro-pneumatic converter which is shown in simplified functional form in FIG. 7, controls the input of water to the controlled process in accordance with the gage reading. In FIG. 1, the electro-pneumatic converter is represented as being in control of a water control valve. The representation in FIG. 3 does not purport to show the specific arrangement of any available device of its category but is presented merely by way of explanation.

The converter incorporates a weighted beam 102, attached near its center on cross-spring 104 which is sufficiently flexible to permit the beam to oscillate in a vertical plane. Attached to one end of the beam is an operating coil 106, suspended in the field of a permanent magnet 108. The converter input current of the electric control unit of FIG. 1 flows through the coil 106 and causes a proportional upward force which tends to rotate the beam clockwise about its pivot. Opposing this force is a second upward force produced by the converter output pressure through feed-back bellows 110 which tend to rotate the beam in a counterclockwise direction.

When the rotational forces described above are equal, a balanced condition exists and the beam 102 does not tend to rotate in either direction.

It will be seen, however, that the converter will always operate to automatically maintain this balanced condition. The converter output pressure is, therefore, held in a fixed ratio to the input current.

The manner in which any unbalance is detected and balance is restored is as follows: air from a regulated supply is fed through an inlet 112 and exhausts through a nozzle 114 whose aperture is considerably larger than the inlet 112. The end of the beam serves as a baffle to control the flow of air from the nozzle. Thus, if the baffle moves closer to the nozzle, air flow is reduced and the nozzle back-pressure increases and vice versa.

Suppose that pressure in the feed-back bellows 110 is too low, then the weighted beam will rotate clockwise thereby increasing the nozzle back-pressure. The nozzle back-pressure is exerted on the upper part of two mechanically coupled diaphragms. Thus, the pressure increase causes both diaphragms to deflect upwardly and open a lower ball valve 120. The resulting air flow from the air supply at inlet 122 causes pressure on the lower diaphragm 118 to increase until equilibrium is reached such that the beam 102 is balanced. Both diaphragms are flat and both ball valves 120 and 124 are closed.

The area of the upper diaphragm 116 is approximately twice that of the lower diaphragm 118 so that at equilibrium, output pressure is twice as great as nozzle back-pressure. Thus, the diaphragm and the ball valve assembly function as a pressure amplifier, so to speak. The high air capacity of the ball valves permits the rapid changes of output pressure. If output pressure is too high compared to the converter input current, the operation is reversed to that described above. That is, the beam rotates away from the nozzle, decreasing nozzle back-pressure and causing the diaphragms to deflect in an upward direction. This opens the upper ball valve, exhausts air to the atmosphere and decreases the output pressure until equilibrium is restored. The output pressure at exit 126 is applied to the water control valve of FIG. 1 to regulate the amount of moisture added to the sinter being fed to the pug mill.

While the novel features of the invention have been illustrated and described in connection with a specific embodiment of the invention, it is believed that this embodiment will enable others skilled in the art to apply the principles of the invention in forms departing from the exemplary embodiment herein, and such departures are contemplated by the claims.

We claim:

1. A moisture gaging system comprising a source of fast neutron and gamma radiation for irradiation of substantially an entire cross sectional volume of a bulk substance moving in a confined stream of irregular and varying cross section, slow neutron responsive means responsive to slow neutrons from said cross sectional volume irradiated by neutrons for deriving a first electrical control energy varying with the moisture content of an irradiation volume of said substance, gamma responsive means responsive to gamma radiation from said cross sectional volume irradiated by gamma radiation for deriving a second electrical control energy varying with the mass of said substance in an irradiation volume thereof, and means jointly responsive to said first and second electrical control energies for obtaining the ratio existing between said first and second control energies and for generating an output signal proportional to the weight percentage moisture content of said substance substantially independently of the geometry of the material in the stream of material being gaged.

2. A moisture gaging system as defined in claim 1, wherein said source of fast neutrons and gamma radiation are in a holder extending across the stream of bulk substance being gaged.

3. A moisture gaging system as defined in claim 1, wherein said slow neutron responsive means and said gamma responsive means each comprises a plurality of slow neutron and gamma detectors spaced across the stream of bulk substance being gaged.

4. A moisture gaging system comprising a source of fast neutron and gamma radiation for irradiation of a bulk substance having moisture content to be gaged, slow neutron responsive means positioned to receive nuetrons which emanate from said source and traverse a preselected irradiation area of said substance for deriving a first electrical control energy varying with the moisture content of an irradiation volume of said substance, gamma responsive means positioned to receive gamma radiation which emanates from said source and traverses an irradiation area of said substance for deriving a second electrical control energy varying with the mass of said substance in a preselected irradiating volume thereof, means providing comparative electrical energy standards of moisture content and mass, and means responsive jointly to said first and second electrical control energies and to said electrical energy standards for indicating changes in the weight percentage moisture content of said substance from the weight percentage moisture content established by said standards.

5. A moisture gaging system comprising a source of fast neutron and gamma radiation for irradiation of a bulk substance having moisture content to be gaged, slow neutron detector means positioned to receive neutrons which emanate from said source and traverse an irradiation area of said substance for generating electrical potential pulses at a pulse rate varying with the moisture content of a preselected irradiation volume of said substance, means for deriving a first electrical signal of given polarity and having an amplitude varying with the potential pulse rate of said neutron detector means, gamma detector means positioned to receive gamma radiation which emanates from said source and traverses an irradiation area of said substance for generating electrical potential pulses at a pulse rate varying inversely with the mass of said substance in a preselected irradiation volume thereof, means for deriving a second electrical signal of given polarity and having an amplitude varying with the potential pulse rate of said gamma detector means, means providing two standard electrical signals of said given polarities and having amplitudes indicative of standards of moisture content and mass, and means responsive jointly to said first and second electrical signals and to said two standard electrical signals for indicating changes in the weight percentage moisture content of said substance from the weight percentage moisture content established by said two standard electrical signals.

6. In a nuclear moisture gaging apparatus, a pair of parallel rails, a mobile carriage mounted for movement along said rails having supported thereon means for detecting nuclear radiation, upwardly extending supporting means carried by the rear end of said carriage and having a portion extending forwardly over said carriage in spaced relation to the upper face thereof whereby said carriage is adapted for association with a conveyor belt operating at one end of said rails, with the belt operating between said carriage and said forwardly extending portion of said supporting means, means for mounting a source of nuclear radiation on said forwardly extending portion of said supporting means, gage calibrating devices oppositely disposed at the other end of said rails, said calibrating devices including retractable supports adapted to hold calibration blocks, and in which said supports are connected to means for operating the same for interposing said blocks into the radiation beam between said radiation source holder and said radiation detector, said operating means being also effective to retract said supports, and means for operating said carriage along said rails.

7. The apparatus of claim 6, in which timing means in control of said means for operating said supports is effectively connected thereto and is adapted for periodically and sequentially moving said calibration blocks into and out of said radiation beam.

8. In nuclear gaging apparatus, means for supporting a radiation source and a radiation detector in confronting spaced relation to each other, articulated calibration block holding means located at opposite sides of said supporting means, and means for operating each of said articulated holding means operative to interpose and withdraw a calibration block thereon into the area between said radiation source supporting means and said radiation detector supporting means.

9. The apparatus of claim 8, in which said means for operating said articulated holding means is effectively connected to a timing device adapted to periodically energize said operating means to interpose and withdraw said blocks in sequence.

10. The apparatus of claim 8, in which said means for operating said articulated holding means comprise a pair of electrically controlled fluid pressure motors.

References Cited

UNITED STATES PATENTS

| 3,255,975 | 6/1966 | Malin et al. | 250—43.5 |
| 3,278,747 | 10/1966 | Ohmart | 250—83.3 |

FOREIGN PATENTS

| 898,799 | 6/1962 | Great Britain. |

ARCHIE R. BORCHELT, *Primary Examiner.*

U.S. Cl. X.R.

250—43.5, 83.3